(12) United States Patent
Mitchell et al.

(10) Patent No.: US 6,331,595 B1
(45) Date of Patent: Dec. 18, 2001

(54) GRAFTING OF MONOMERS ONTO POLYOLEFINS IN PRESENCE OF ORGANIC PEROXIDES

(75) Inventors: David John Mitchell; Peter Yates Kelly, both of Kingston (CA)

(73) Assignee: DuPont Canada Inc., Mississauga (CA)

(*) Notice: Subject to any disclaimer, the term of this patent is extended or adjusted under 35 U.S.C. 154(b) by 0 days.

(21) Appl. No.: 08/234,959

(22) Filed: Apr. 28, 1994

(51) Int. Cl.[7] ............................... C08F 4/00; C08F 8/06; C08F 255/02
(52) U.S. Cl. ............................ 525/263; 525/64; 525/69; 525/194
(58) Field of Search .................... 525/263, 64, 69, 525/194

(56) References Cited

U.S. PATENT DOCUMENTS

| | | | |
|---|---|---|---|
| 4,612,155 | 9/1986 | Wong et al. | 264/176 R |
| 5,106,916 | * 4/1992 | Mitchell . | |
| 5,112,919 | * 5/1992 | Furrer et al. | 525/263 |
| 5,173,539 | * 12/1992 | Boocock et al. | 525/244 |

* cited by examiner

Primary Examiner—James J. Seidleck
Assistant Examiner—Olga Asinovsky

(57) ABSTRACT

A method for the grafting of a monomer onto a polyolefin in the presence of an organic peroxide is disclosed. The polyolefin is a polyolefin that, when molten, undergoes cross-linking in the presence of the organic peroxide. The method comprises: (a) admixing the polyolefin in an extruder with 25 to 6000 ppm, based on the weight of the polyolefin, of an organic peroxide coated onto a carrier polymer and up to 5%, by weight of the polyolefin, of a grafting monomer capable of being grafted onto the polyolefin in the presence of the organic peroxide. The admixture is heated to a temperature above the melting point of both the polyolefin and the carrier polymer under admixing conditions to effect grafting of said grafting monomer onto the polyolefin, said carrier polymer undergoing chain scission in preference to cross-linking in the presence of the organic peroxide at said temperature. Grafted polyolefin is extruded from the extruder. The method may be used to produce grafted polyolefins with lower levels of gels and specks, especially for use in films and adhesives.

12 Claims, No Drawings

GRAFTING OF MONOMERS ONTO POLYOLEFINS IN PRESENCE OF ORGANIC PEROXIDES

The present invention relates to the grafting of monomers onto polyolefins in the presence of organic peroxides, in which the organic peroxide is on a carrier polymer that, under the grafting conditions, undergoes chain scission in preference to cross-linking in the presence of organic peroxides.

Polymers of alpha-olefins in which the alpha-olefin is a hydrocarbon are well known. Such polymers, especially homopolymers of ethylene and copolymers of ethylene with the higher $C_4$–$C_{10}$ alpha-olefins are used in large volumes for a variety of end-uses. These polymers are relatively non-polar, which is an important and beneficial characteristic for many end-uses. However, non-polar characteristics are also a disadvantage, for instance with respect to adhesion between polar materials and the polyolefins.

Properties of polyolefins may be modified by the grafting of polar monomers onto the polyolefin. Melt grafting processes are described in U.S. Pat. No. 4,612,155 of R. A. Zelonka and C. S. Wong, which issued Sep. 16, 1986. In particular, that patent describes a grafting process in which polyolefin in particulate form is fed to an extruder together with grafting agent and organic peroxide, the latter being in the form of a composition with a second polymer of lower melting point and lower melt viscosity.

In melt grafting processes, it is necessary to obtain adequate mixing of the grafting monomer and organic peroxide in the polyolefin prior to significant formation of radicals upon decomposition of the organic peroxide. If the mixing is inadequate, there is a tendency for the polyolefin and/or grafting monomer to undergo cross-linking reactions which form localized cross-linked polymer that becomes apparent as gel, black contaminant particles or other specks in the grafted polymer in the extruder. Both gel and black contaminant particles or other specks are unacceptable in any significant level for many end-uses e.g. in films.

A grafting process that is less susceptible to gel formation and speck formation has now been found.

Accordingly, the present invention provides a method for the grafting of a monomer onto a polyolefin in the presence of an organic peroxide, said polyolefin being a polyolefin that, when molten, undergoes cross-linking in the presence of the organic peroxide, said method comprising:

(a) admixing in an extruder an admixture of (i) said polyolefin, (ii) 25 to 6000 ppm, based on the weight of the polyolefin, of an organic peroxide coated onto a carrier polymer, the amount of organic peroxide coated onto said carrier polymer being at least 0.2% by weight of the carrier polymer, and (iii) up to 5%, by weight of the polyolefin, of a grafting monomer capable of being grafted onto the polyolefin in the presence of the organic peroxide;

(b) heating the admixture to a temperature above the melting point of both the polyolefin and the carrier polymer under admixing conditions to effect grafting of said grafting monomer onto the polyolefin, said carrier polymer undergoing chain scission in preference to cross-linking in the presence of the organic peroxide at said temperature; and (c) extruding grafted polyolefin from the extruder.

In a preferred embodiment of the method of the present invention, the grafted polyolefin so extruded has a lower level of gel and specks than if the carrier polymer had been a polyolefin that does not undergo chain scission in the presence of the organic peroxide. In particular, the grafted polyolefin has a lower level of gel and specks than obtained when the polyolefin of step (a)(i) is also used as the carrier polymer.

In another embodiment, the melting point of the carrier polymer is higher than the melting point of the polyolefin.

As used herein, it is understood that it may be determined whether a polymer preferentially undergoes chain scission or cross-linking in the presence of an organic peroxide at the temperature of grafting by extruding the polymer at the temperature of grafting in the presence of the organic peroxide and determining whether the molecular weight of the polymer increases or decreases. As disclosed above, the temperature of grafting is above the melting point of both the carrier polymer and the polyolefin that is to be grafted.

The process of the present invention involves feeding to an extruder an admixture of a polyolefin, organic peroxide coated onto a carrier polymer and a grafting monomer. The polyolefin may be a homopolymer of ethylene or copolymer of ethylene or propylene, including copolymers with the higher alpha-olefins e.g. $C_4$–$C_{10}$ alpha-olefins, examples of which are butene-1, 4-methyl pentene-1, hexene-1 and octene-1. In addition, the polyolefin may be a copolymer of ethylene with one or more other ethylenically-unsaturated monomers that are polar in nature e.g. vinyl esters of carboxylic acids, vinyl halides and unsaturated carboxylic acids or esters thereof. Specific examples include copolymers of ethylene with at least one of acrylic acid, methacrylic acid, carbon monoxide, methyl acrylate, butyl acrylate, methyl hydrogen maleate and vinyl acetate. In addition, the polyolefin may be an ionomer e.g. a sodium, zinc or aluminum ionomer of an acid copolymer formed from ethylene and an ethylenically unsaturated carboxylic acid. Examples of the above polymers are available from Du Pont Canada Inc. or E.I. du Pont de Nemours and Company under the trade marks Sclair®, Elvax®, Nucrel® or Surlyn®, depending on the particular polymer.

The organic peroxide used in the process of the present invention has a half-life at 150° C. of from about one minute to about 120 minutes. The organic peroxide, which as used herein includes hydroperoxides, may for example be a peroxy ester, peroxy ketal, bis (tert.-alkyl peroxy alkyl) benzene, dicumyl peroxide or acetylenic diperoxy compound. Other organic peroxides are known to those skilled in the art, including t-butyl hydroperoxide and di-t-butyl peroxide. Preferred organic peroxides are 2,5-dimethyl-2,5-di(t-butyl peroxy) hexane and 2,5-dimethyl-2,5-di(t-butyl peroxy)hexyne-3 which are available under the trade marks Lupersol 101 and 130, respectively, from Elf Atochem. The organic peroxide is coated onto a polymer in an amount of at least 0.2% by weight, which may result in absorption into the polymer, such that the polymer acts as a carrier for the organic peroxide. The carrier polymer is a polymer that, under the grafting conditions, undergoes chain scission in preference to cross-linking in the presence of an organic peroxide. In preferred embodiments, the carrier polymer also has a melting point that is higher than the melting point of the polyolefin, although the melting point of the carrier polymer should not be unreasonably higher because both the polyolefin and carrier polymer need to become molten during the extrusion process, without excessive heating especially excessive heating of the polyolefin or carrier polymer above its melting point. Examples of the carrier polymer are polypropylene, copolymers of propylene with ethylene or other $C_4$–$C_{10}$ alpha-olefin, poly-1-butene, copolymers of 1-butene with minor amounts of ethylene or other $C_3$–$C_{10}$ alpha-olefin, polystyrene, and block copolymers of styrene with a $C_4$–$C_8$. diene.

The grafting monomer may be ethylenically unsaturated carboxylic acids and ethylenically unsaturated carboxylic acid anhydrides, including derivatives of such acids, and mixtures thereof, and vinyl trialkoxy silanes. Examples of the acids and anhydrides, which may be mono, di- or polycarboxylic acids, are acrylic acid, methacrylic acid, maleic acid, fumaric acid, itaconic acid, crotonic acid, itaconic anhydride, maleic anhydride and substituted maleic anhydride e.g. dimethyl maleic anhydride or citraconic anhydride, nadic anhydride, nadic methyl anhydride and tetrahydro phthalic anhydride. Examples of derivatives of the unsaturated acids are salts, imides, amides and esters e.g. mono- and disodium maleate, acrylamide, maleimide, glycidyl methacrylate and diethyl fumarate. Examples of the vinyl trialkoxy silanes are vinyl trimethoxy silane and vinyl triethoxy silane.

The amount of organic peroxide will depend in particular on the characteristics of the polyolefin and of the grafting monomer but will be in the range of 25–6000 ppm, especially 100–3000 ppm, and particularly in the range of 500–2000 ppm, based on the amount of polyolefin in the admixture fed to the extruder.

The amount of monomer will depend in particular on the reactivity of the monomer and the level of grafting that is to be achieved. For example, if the monomer is maleic anhydride, the amount of monomer may be as high as about 5% by weight of the polyolefin, especially 0.1–3% by weight and particularly in the range of 0.2–2% by weight. With other monomers, different amounts may be preferred.

In preferred embodiments of the invention, the temperature of the extruder, the half-life of the organic peroxide at the extrusion temperature, the relative melting points of the polyolefin and carrier polymer, the rate of chain scission of the carrier polymer at the extrusion temperature, the melt viscosities of the polyolefin and the carrier polymer, especially during chain scission, are all balanced to obtain uniform distribution of the grafting monomer in the melt sufficiently prior to decomposition of the organic peroxide at significant rates in order to optimize the uniformity of the grafted polyolefin, including minimal formation of gel or black contaminants or specks. Such an ability to optimize the process will depend on many factors, including the particular extruder being used.

While additives may be incorporated into the polyolefin or carrier polymer prior to feeding the admixture to the extruder, it will be appreciated by persons skilled in the art that some additives have detrimental effects on the grafting process, and for that reason should not be used in the process of the present invention.

The components of the admixture may be fed to the extruder in a number of ways. For example, the polyolefin may be fed to the extruder and heated to a molten condition. The organic peroxide, on carrier polymer, and grafting monomer may then be fed directly into the molten polyolefin, using the same or different ports in the extruder. Alternatively, one or more of the organic peroxide and grafting monomer may be fed to the extruder simultaneously with the polyolefin, especially the organic peroxide. The extruder should have good mixing characteristics, with twin screw extruders being the preferred type of extruder but other extruders with good mixing characteristics may be used.

The process of the present invention may be used to produce compositions of monomer grafted onto polyolefins with lower levels of gel and black contaminants, especially in comparison with the corresponding grafting process in the absence of use of a carrier of the type described herein. The grafted polyolefin obtained by the process will normally be in the form of pellets or other comminuted shapes, but is not restricted thereto. The grafted polyolefins may be used as such or as blends with other polymers, especially in the form of adhesive compositions for use with polymers or metals, in co-extrusion of multi-layer structures, in coating compositions, as compatibilizers in filled compositions and to improve the dyeability and printability of polymers.

The present invention is illustrated by the following examples.

EXAMPLE I

This example illustrates the degree of film contamination formed in grafted polyolefins made using peroxide carrier resins which are not part of the present invention i.e. each of polymers (i), (ii) and (iii) in Table I below, undergo cross-linking in preference to chain scission in the presence of organic peroxide under the grafting conditions.

The grafting extruder used in this example was an intermeshing co-rotating twin-screw extruder with a barrel having a ratio of length:diameter of 38:1. The temperature was set at 235° C.

An admixture was formed in the extruder from a base polyolefin, viz. an ethylene/vinyl acetate copolymer, organic peroxide and maleic anhydride.

The organic peroxide, viz. Lupersol 101, was coated onto a carrier polymer. The polyolefin and organic peroxide were each fed, as an admixture, to the extruder in pellet form, and the maleic anhydride was fed directly into the first zone of the extruder. The polymer was extruded from the extruder into water in the form of a strand and pelletized.

The grafted polyolefin was fed subsequently to a 1.9 cm diameter single screw extruder operating at 180° C. and extruded into a film having a width of 8 cm.

Gels and black contaminant particles or other specks in a sample of the film were counted and normalized to the weight of sample being assessed. In this example and in the examples that follow, the measured gel and speck level of the grafted polyolefin has been compared to the gel and speck level of the base polyolefin extruded through the same equipment in the absence of both organic peroxide and grafting monomer. The grafted polyolefin has been assigned a Gel Index based upon this comparison according to the formula:

$$\text{Gel Index} = 5 \times \text{LOG}_{10}\left(\frac{(NGC_{grafted\ polyolefin})}{(NGC_{base\ polyolefin})}\right)$$

where NGC=normalized gel count.

The results for Runs 1–4 are reported in Table I. Run 1 was a control run in which neither organic peroxide nor grafting monomer was used. In each of Runs 2–4, the amount of maleic anhydride fed to the extruder was 1.6% and the amount of organic peroxide fed was 1600 ppm, each based upon the total weight of the base polyolefin plus carrier polymer.

TABLE I

| Run No. | Base Polyolefin | Carrier Polymer | % Monomer Grafted | Gel Index |
|---|---|---|---|---|
| 1 | A | none | — | 0 |
| 2 | A | i | 1.5 | 4 |
| 3 | A | ii | 1.5 | 6 |
| 4 | A | iii | 1.3 | 5 |

Note:
Polyolefin A = ethylene/vinyl acetate copolymer, containing 9% of vinyl acetate and having a melt index of 7 dg/min
Polymer i = Polyolefin A
Polymer ii = ethylene/vinyl acetate copolymer, containing 18% of vinyl acetate and having a melt index of 150 dg/min
Polymer iii = ethylene/butene linear low density copolymer (polyethylene) having a density of 0.93 g/cm$^3$ and a melt index of 73 dg/min As used in this example, melt index was measured according to the procedure of ASTM D-1238 at 190° C. and using a 2160 g weight.

These runs demonstrate that grafting of polyolefin A using carrier polymers which undergo crosslinking in the presence of organic peroxides results in a grafted product having a significantly increased level of gels and specks.

EXAMPLE II

The procedure of Example I was repeated, using different carrier polymers which illustrate an embodiment of the present invention i.e. using carrier polymers that undergo chain scission in preference to cross-linking in the presence of an organic peroxide.

In each of the runs in this example, the amount of maleic anhydride fed to the extruder was 1.4% and the amount of organic peroxide fed was 1200 ppm, each based upon the total weight of the base polyolefin plus carrier polymer. The organic peroxide employed in these runs was Lupersol 101.

TABLE II

| Run No. | Base Polyolefin | Carrier Polymer | % Monomer Grafted | Gel Index |
|---|---|---|---|---|
| 5 | A | iii | 0.9 | 5 |
| 6 | A | iv | 1.0 | 2 |
| 7 | A | v | 1.1 | 1 |

Note
Polymer iv = propylene/ethylene copolymer having a DSC melting point of 129° C. and a melt flow index of 5 dg/min.
Polymer v = propylene/ethylene copolymer having a DSC melting point of 135° C. and a melt flow index of 6.8 dg/min.

The melt index of polymers (iv) and (v) was measured using the procedure of ASTM D-1238 at 230° C. and with a 2160 g weight. Run 5 is a comparative run, using a polymer of Example I.

These runs demonstrate that grafting of polyolefin A using carrier polymers which undergo scissioning in the presence of organic peroxides results in a grafted product having a significantly reduced level of gels and specks.

EXAMPLE III

The procedure of Example II was repeated, using a different base polyolefin.

In each of the runs in this example, the amount of maleic anhydride fed to the extruder was 1.5% and the amount of organic peroxide fed was 1600 ppm, each based upon the total weight of the base polyolefin plus carrier polymer. The organic peroxide employed in these runs was Lupersol 101.

TABLE III

| Run No. | Base Polyolefin | Carrier Polymer | % Monomer Grafted | Gel Index |
|---|---|---|---|---|
| 8 | B | vi | 1.1 | 8 |
| 9 | B | iv | 1.2 | 2 |
| 10 | B | vii | 1.3 | 0 |
| 11 | B | viii | 1.3 | -2 |

Note
Polyolefin B = ethylene/vinylacetate copolymer, containing 28% of vinyl acetate and having a melt index of 6 dg/min.
Polymer vi = Polyolefin B
Polymer vii = propylene/ethylene copolymer having a DSC melting point of 135° C. and a melt flow index of 4.6 dg/min.
Polymer viii = propylene/ethylene copolymer having a DSC melting point of 143° C. and a melt flow index of 5 dg/min.

The melt index of Polymer B was measured at 190° C. and the melt indices of polymers (vii) and (viii) were measured at 230° C.

Run 8 is a comparative run, which employed an ethylene/vinyl acetate copolymer as the carrier polymer. It exhibited a large degree of gel contamination since this carrier polymer undergoes crosslinking predominantly under these conditions in the presence of organic peroxide. Runs 9–11 each employed a polypropylene copolymer carrier and exhibit very much lower levels of gel because the carrier polymers undergo scissioning predominantly under these conditions.

EXAMPLE IV

The procedure of Example I was repeated, using additional different carrier polymers which further illustrate embodiments of the present invention.

In each of the runs in this example, the amount of maleic anhydride fed to the extruder was 1.5% and the amount of organic peroxide fed was 1600 ppm (except 2200 ppm in runs 13 and 17), each based upon the total weight of the base polyolefin plus carrier polymer. The organic peroxide employed in these runs was Lupersol 101.

TABLE IV

| Run No. | Base Polyolefin | Carrier Polymer | % Monomer Grafted | Gel Index |
|---|---|---|---|---|
| 12 | A | vii | 1.1 | 0 |
| 13 | A | ix | 0.8 | 0 |
| 14 | A | x | 1.1 | 0 |
| 15 | A | xi | 1.1 | 8 |
| 16 | B | iv | 1.1 | 1 |
| 17 | B | ix | 0.7 | -1 |

TABLE IV-continued

| Run No. | Base Polyolefin | Carrier Polymer | % Monomer Grafted | Gel Index |
|---|---|---|---|---|
| 18 | B | xii | 1.0 | 3 |
| 19 | B | xi | 1.2 | 8 |

Note:
Polymer ix = styrene homopolymer having a melt flow index of 9 dg/min.
Polymer x = butene/ethylene copolymer having a density of 0.895 g/cm$^3$ and a melt flow index of 4.0 dg/min.
Polymer xi = ethylene/propylene elastomer having a Mooney viscosity (100° C., 1 + 8) of 33
Polymer xii = styrene-ethylene/butene-styrene block copolymer having a melt flow index of 65 dg/min.

Melt Index of polymers (ix) and (xii) was measured at 200° C. and a weight of 5000 g, whereas that for polymer (x) was measured at 230° C. and a weight of 2160 g.

Runs 12–14 and 16–18 all exhibit reduced levels of film contaminants when compared respectively with comparative Runs 15 and 19 which employed a carrier polymer for the organic peroxide which was outside the scope of the invention.

EXAMPLE V

The procedure of Example II was repeated, using a different base polyolefin.

In each of the runs in this example, the amount of maleic anhydride fed to the extruder was 1.5% and the amount of organic peroxide fed was 1500 ppm, each based upon the weight of the base polyolefin plus carrier polymer. The organic peroxide employed in these runs was Lupersol 101.

TABLE V

| Run No. | Base Polyolefin | Carrier Polymer | % Monomer Grafted | Gel Index |
|---|---|---|---|---|
| 20 | C | xiii | 1.4 | 4 |
| 21 | C | iv | 1.5 | −1 |

Note:
Polyolefin C = ethylene/methyl acrylate copolymer, containing 21% of methyl acrylate and having a melt index of 2 dg/min.
Polymer xiii = ethylene/methyl acrylate copolymer, containing 20% of methyl acrylate and having a melt index of 5 dg/min.

Melt index was measured at 190° C. using a weight of 2160 g. Run 20 is a comparative example.

This example again shows the reduction in gel count that is obtainable.

EXAMPLE VI

The procedure of Example II was repeated, using a different base polyolefin.

In each of the runs in this example, the amount of maleic anhydride fed to the extruder was 1.1% and the amount of organic peroxide fed was 570 ppm, each based upon the weight of the base polyolefin plus carrier polymer. The organic peroxide employed in these runs was Lupersol 101. The carrier polymers were as defined previously.

TABLE V

| Run No. | Base Polyolefin | Carrier Polymer | % Monomer Grafted | Gel Index |
|---|---|---|---|---|
| 22 | D | iii | 0.7 | 7 |
| 23 | D | vii | 0.7 | 4 |

Note:
Polyolefin D = ethylene/butene-1 linear low density copolymer having a density of 0.92 g/cm$^3$ and a melt index of 12 dg/min.

Melt index was measured at 190° C. using a weight of 2160 g. Run 22 is a comparative example.

This example again shows the reduction in gel count that is obtainable.

What is claimed is:

1. A method for the grafting of a monomer onto a polyolefin in the presence of an organic peroxide, said polyolefin being a polyolefin that, when molten, undergoes cross-linking in the presence of the organic peroxide, said method comprising:
   (a) admixing in an extruder an admixture of (i) said polyolefin, (ii) 25 to 6000 ppm, based on the weight of the polyolefin, of an organic peroxide coated onto a carrier polymer, the amount of organic peroxide coated onto said carrier polymer being at least 0.2% by weight of the carrier polymer, and (iii) up to 5%, by weight of the polyolefin, of a grafting monomer capable of being grafted onto the polyolefin in the presence of the organic peroxide;
   (b) heating the admixture to a temperature above the melting point of both the polyolefin and the carrier polymer under admixing conditions to effect grafting of said grafting monomer onto the polyolefin, said carrier polymer undergoing chain scission in preference to cross-linking in the presence of the organic peroxide at said temperature; and
   (c) extruding grafted polyolefin from the extruder.

2. The method of claim 1 in which the grafted polyolefin so extruded has a lower level of gel and specks than if the carrier polymer had been a polyolefin that does not undergo chain scission in the presence of the organic peroxide.

3. The method of claim 2 in which the grafted polyolefin has a lower level of gel and specks than obtained when the polyolefin of step (a)(i) is also used as the carrier polymer.

4. The method of claim 1 in which the melting point of the carrier polymer is higher than the melting point of the polyolefin.

5. The method of claim 1 in which the polyolefin is selected from the group consisting of homopolymers of ethylene, copolymers of ethylene or propylene with higher $C_4$–$C_{10}$ alpha-olefins, copolymers of ethylene with one or more other ethylenically-unsaturated monomers that are polar, and ionomers.

6. The method of claim 5 in which the ethylenically-unsaturated monomers are selected from vinyl esters of carboxylic acids, vinyl halides and unsaturated carboxylic acids or esters thereof.

7. The method of claim 6 in which the polyolefin is a copolymer of ethylene with at least one of acrylic acid, methacrylic acid, carbon monoxide, methyl acrylate, butyl acrylate, methyl hydrogen maleate and vinyl acetate.

8. The method of claim 5 in which the carrier polymer is polypropylene, copolymers of propylene with ethylene or other $C_4$–$C_{10}$ alpha-olefin, poly-1-butene, copolymers of 1-butene with minor amounts of ethylene or other $C_3$–$C_{10}$ alpha-olefin, polystyrene, or block copolymers of styrene with a $C_4$–$C_{10}$ diene.

9. The method of claim 5 in which the grafting monomer is selected from the group consisting of ethylenically unsaturated carboxylic acids and ethylenically unsaturated carboxylic acid anhydrides, including derivatives of such acids, and mixtures thereof, and vinyl trialkoxy silanes.

10. The method of claim 9 in which the grafting monomer is selected from acrylic acid, methacrylic acid, maleic acid, fumaric acid, itaconic acid, crotonic acid, itaconic anhydride, maleic anhydride and substituted maleic anhydride, nadic anhydride, nadic methyl anhydride, tetrahydro phthalic anhydride, mono- and disodium maleate, acrylamide, maleimide, glycidyl methacrylate, diethyl fumarate, vinyl trimethoxy silane and vinyl triethoxy silane.

11. The method of claim 1 in which the amount of organic peroxide is in the range of 100–3000 ppm.

12. The method of claim 1 in which the monomer is maleic anhydride and the amount is 0.1–3% by weight of the polyolefin.

* * * * *